July 15, 1941.  I. BENKÖ  2,249,309

PHYSICAL TRAINING APPLIANCE

Filed May 17, 1938  3 Sheets-Sheet 2

Inventor
Ivan Benko
By Hascock Downing Seebois
Attys.

July 15, 1941.  I. BENKÖ  2,249,309
PHYSICAL TRAINING APPLIANCE
Filed May 17, 1938   3 Sheets-Sheet 3
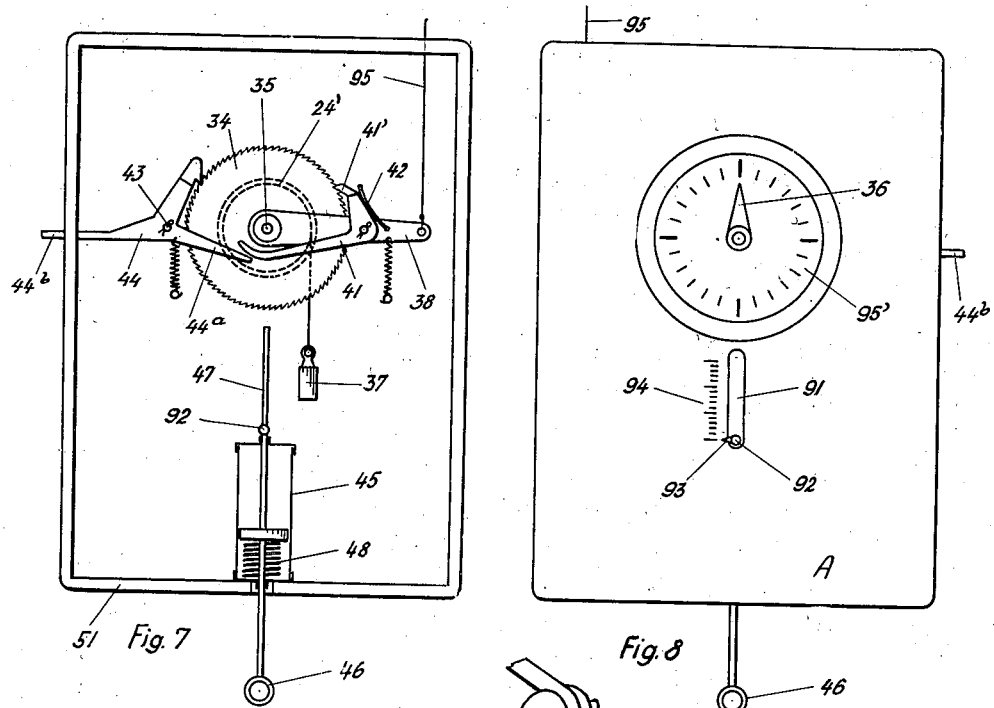
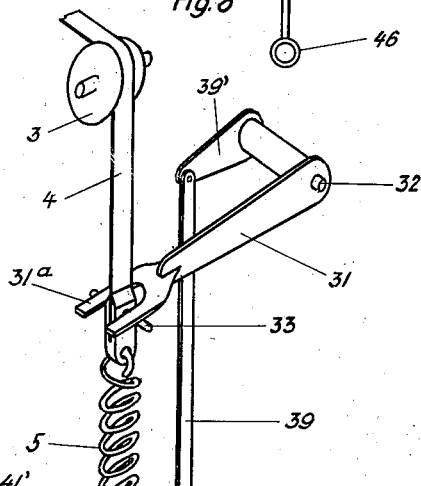
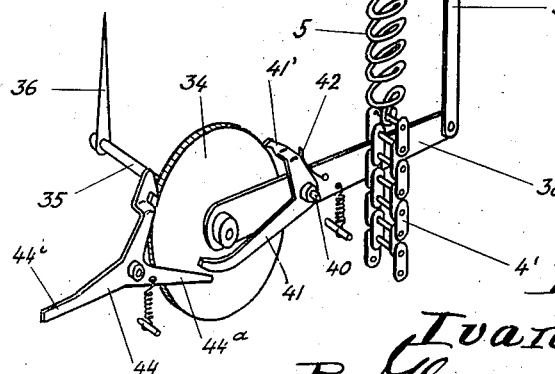
Inventor
Ivan Benko Patented July 15, 1941

2,249,309

UNITED STATES PATENT OFFICE 2,249,309

PHYSICAL TRAINING APPLIANCE

Ivan Benkö, Vienna, Germany

Application May 17, 1938, Serial No. 208,506
In Austria August 14, 1937

7 Claims. (Cl. 265—22)

This invention relates to a physical training device in which a punching ball or the like is so mounted that it is free to swing or oscillate in various directions in response to the blows delivered by the person using the device. The invention consists, in connection with a physical training device of this nature, in the provision of means for measuring and/or indicating the sum total of the effort exerted in punching the ball or the like during a given period of time, and that continuously, so that the total may be read off at any one time.

Devices are known in which the strength of a blow delivered to a ball, plate, figure, or the like is indicated, the indicating device being arranged to return to the zero position after each individual blow. These known devices, which generally take the form of coin-freed machines, are as a rule intended only for purposes of amusement, while the device according to the present invention is designed to serve in particular for purposes of serious physical training, since, while retaining all the possibilities afforded by the known punching balls used by boxers and others for training purposes, it also registers the training person's total performance over a given space of time or for a given number of blows.

The purpose of the invention is achieved in a particularly favorable manner by so coupling the punching ball or the like with the additive indicating device that the oscillatory movements of the ball are transmitted to the member which directly imparts the feed movement for advancing the mechanism of the said indicating device. The arrangement for this purpose may with advantage be such that the oscillatory movements of the punching ball or the like brought about by the action of the blows delivered thereto cause a resilient member (spring, rubber cord, or the like) which is connected with the ball or the like through the intermediary of a cord, linkage, or the like, and which is operatively associated with the additive indicating device, to be alternately tensioned and relieved of tension according to the oscillations of the ball.

The training device according to the invention may be combined with a contrivance which is tuned or adjustable to a certain period of time or number of blows or total performance, and which, on completion of this period of time or of this total performance or number of blows, stops the additive indicating device. In this manner an accurate check can be kept on performance and on the progress made in the course of a period of training.

Several forms of construction embodying the invention are shown, by way of example, in the accompanying drawings, in which—

Figs. 3 and 4 show details, in perspective view, of the form of construction shown in Figs. 1 and 2, the parts being shown in Fig. 3 in a position different from that in which they are shown in Fig. 1.

Fig. 7 shows, in rear elevation with the back wall removed, a modified form of additive indicating device for use e. g. with training appliances of the types shown in Figs. 5 and 6, while Fig. 8 is a front elevation of the same.

Figures 1, 2:
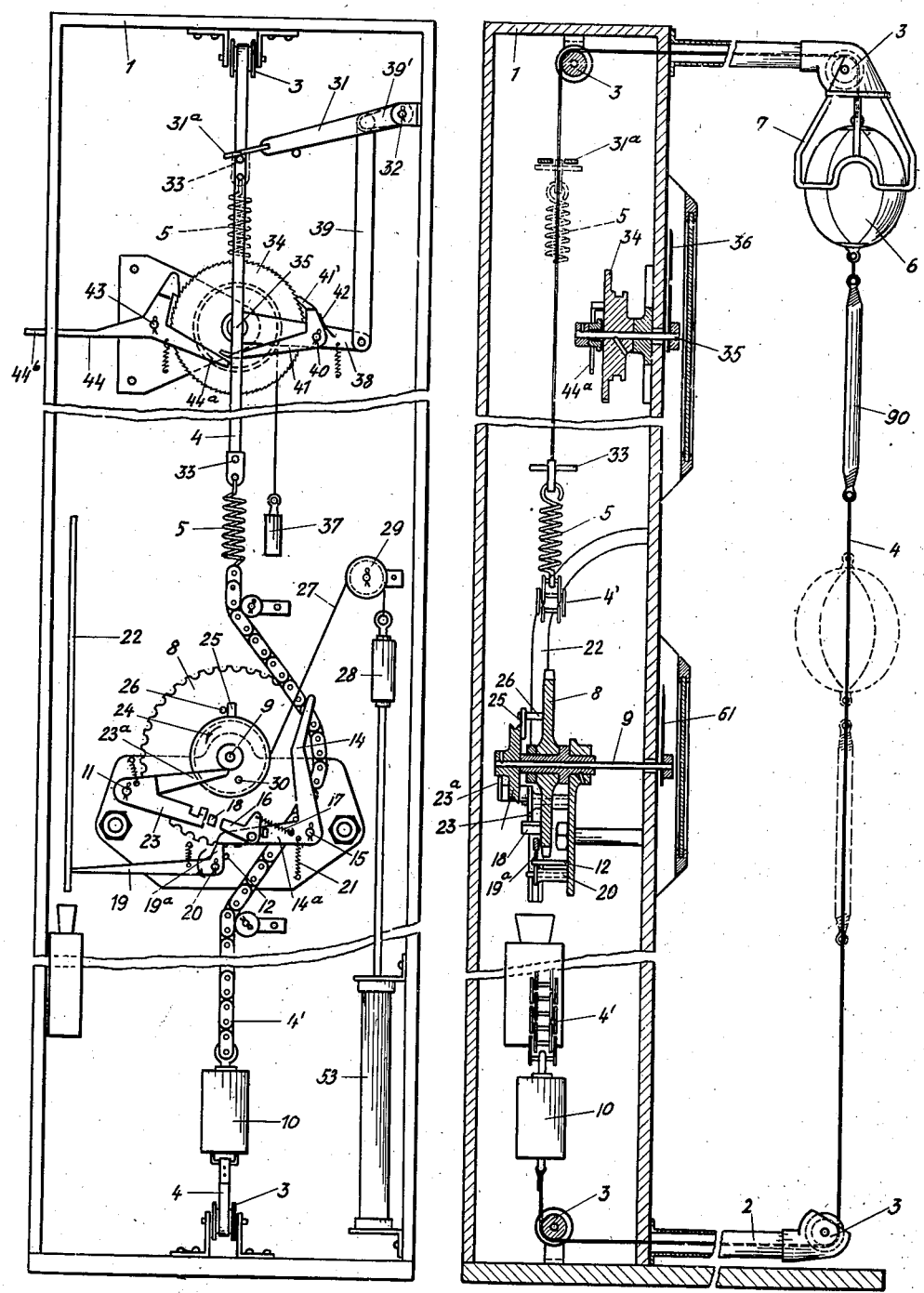
Fig. 1 is a rear elevation of one form of construction of the device according to the invention, with the rear wall thereof removed.
Fig. 2 is a vertical section of the same form of construction.

In the first form of construction of the invention, shown in Figs. 1–4 of the drawings, it is assumed that the bringing of the apparatus into the operative position is governed by coin-freed mechanism, and that the blow-receiving element is a punching ball. On and in a casing 1 are mounted four rollers 3. Over these rollers and through tubes 2 runs a band, belt, or the like 4 in which there are interposed a spring 5, a chain 4', and a weight 10, and in which there is also secured a punching ball 6 in such a manner that it is enclosed in a protective cage 7 when the apparatus is in the position of rest. A part of the linkage between the ball 6 and the weight 10 may be formed by a resilient member 90 in the form of a rubber cord, or the like. The chain 4' runs over a sprocket wheel 8 which is rotatably mounted on an axle 9, and which is retained by the weight 10 in the position shown in Fig. 1 when the apparatus is at rest. On the sprocket wheel 8 there is provided a pin 18 in front of which, when the apparatus is in the position of rest, is disposed a pawl 16 which is stressed by a spring 17, and which is articulated to a bell-crank lever 14, 14a pivotally mounted upon a pin 15 and loaded by a spring 21. The end of the arm 14a of the bell-crank lever 14, 14a rests upon the arm 19a of a bell-crank lever 19, 19a which is pivotally mounted on a pin 20, and the other arm 19 of which engages with its end in a coin chute 22.

Pivotally mounted on an axle 11 disposed to one side of the sprocket wheel 8 there is provided a bell-crank lever 23, 23a the arm 23 of which lies in the path of movement of the pin 18 on the sprocket wheel 8 and is shaped for example in the form of a hook at its free end. The arm 23a extends in a different plane from the arm 23.

On the axle 9 of the sprocket wheel 8 there is rotatably mounted a cord pulley 24 from which a cord 27 leads over a roller 29 to a weight 28 from which there is suspended the plunger of a pump 53. This cord pulley is furnished with a peg 30 which co-acts in a manner to be described in due course, with the arm 23a of the bell-crank lever 23, 23a, and also with a stop 25 which, in the position of rest of the apparatus, shown in the drawings, presses against a pin 26 secured to the sprocket wheel 8.

A ratchet wheel 34, to which an initial tension is imparted by means of a weight 37, is provided on a shaft 35 to the end of which there is fitted a pointer 36. With a ratchet wheel 34 there coacts a bell-crank lever 41, 41' which is shaped at one end to form a pawl 41', is mounted on a pivot pin 40, and is stressed by a leaf spring 42. The pin 40 is carried by a lever 38 which is idly mounted by one end on the shaft 35 of the ratchet wheel 34 and connected by its other end, through the intermediary of links 39, 39' and a journal pin 32 mounted on the casing 1, with a lever 31. The free end 31a of the lever 31 is bifurcated to allow of the passage therethrough of the belt 4 which carries, at a point immediately beneath the lever 31 when the apparatus is in the operative position, a stop 33 beneath which the spring 5 is hooked in.

With the ratchet wheel 34 there also coacts a pawl lever 44 which is mounted for pivotal movement about a pin 43, and which engages with an arm 44a beneath the lever 41 carrying the pawl 41', and projects out of the casing 1 with the end of another arm 44b.

Figure 3:
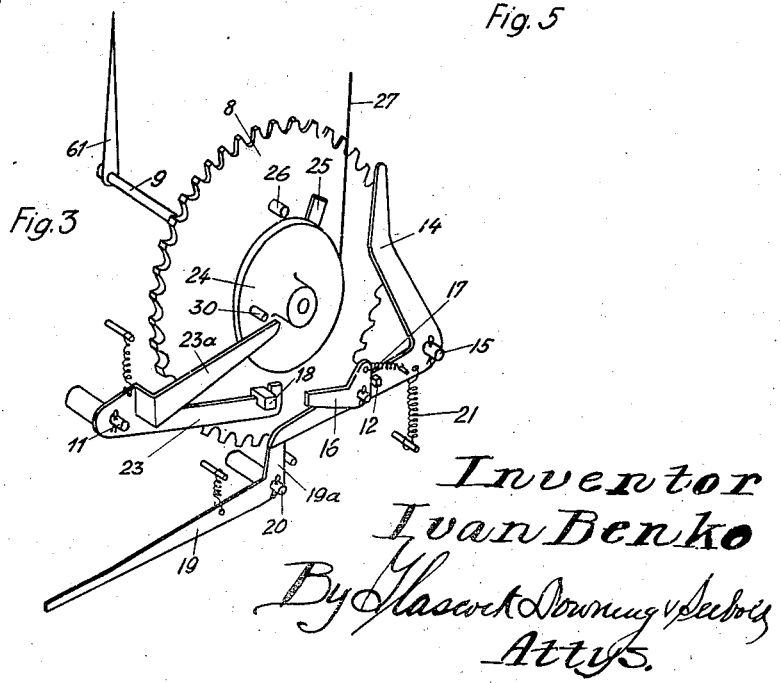

The mode of operation of the device is as follows: When a coin is inserted in the coin chute 22 the bell-crank lever 19, 19a is moved in the direction indicated by the arrow, so that the arm 19a liberates the bell-crank lever 14, 14a which then carries out a pivotal movement in response to the action of the spring 21 until a stop 12 is encountered. The pawl 16 coupled with the lever 14 is thereby also moved out of the path of the arresting pin 18 provided on the sprocket wheel 8, so that this wheel is then free for rotation in an anti-clockwise direction. This rotation is effected by the exerting of a pull on the ball 6 calculated to bring this ball out of the position shown in full lines in Fig. 2, in which the ball is in the protective cage 7, into the position shown in broken lines. The chain sprocket wheel 8 thereby carries out a rotational movement of such extent that, as shown in Fig. 3, the arresting pin 18 comes into engagement with the hooked end of the arm 23 of the bell-crank lever 23, 23a, with the result that the sprocket wheel is locked against movement in either direction. By virtue of the fact that the sprocket wheel 8 is rotated in the specified manner the peg 26 fixedly attached to this wheel liberates the stop 25 provided on the cord pulley 24, so that the cord pulley is then free to rotate in the direction indicated by the arrow, in response to the action of the weight 28. The speed at which this rotation of the cord pulley should take place may be regulated by suitable adjustment or setting of the pump 53 acting as a brake. The adjustment may for example be such that the releasing pin 30 provided on the pulley 24 encounters the arm 23a of the bell-crank lever 23, 23a after the lapse of a minute. The passage of time may be indicated by means of a pointer 61 coupled with the shaft of the cord pulley 24.

If blows be then delivered by the person using the training device to the punching ball 6 this ball is caused to carry out oscillatory movements at each of which the spring 5 interposed in the belt 4 is tensioned to an extent corresponding to the strength of each blow. In accordance therewith the stop 33 attached to the belt 4 adjacent the upper end of the spring 5 carries out, during the oscillations of the ball 6, vertical reciprocating movements of corresponding magnitude, which are transmitted to the lever 31 thereby causing this lever to oscillate about its pivot pin through corresponding angles. These oscillatory movements of the lever 31 are transmitted, by means of the links 39, 39', to the lever 38 and thus also to the pawl 41' with the result that this pawl also carries out corresponding oscillatory movements, and the ratchet wheel 34, which is locked against reverse rotation by the pawl lever 44, is moved forward to an extent corresponding to a certain number of teeth. At the same time the pointer 36 mounted on the shaft 35 of the ratchet wheel 34 moves a certain distance away from the zero position. Since the wheel 34 and the pointer 36 are constantly fed forward in the same direction during a series of blows the pointer 36 always indicates the total performance from the commencement of the period of training up to the moment of reading. In the meantime the cord pulley 24 rotates in response to the action of the weight 28 and constantly exerts, by means of the pump 53, a braking action in the direction of the arrow in Fig. 1, until the pin 30 encounters the arm 23a and pivotally moves the bell-crank lever 23, 23a about its axis 11. The arm 23 thereby liberates the pin 18 on the chain sprocket wheel 8, and this wheel is then moved by the weight 10 into the position of rest shown in Fig. 1, the pawl 16 again coming into position in front of the pin 18 and the pin 26 in front of the stop 25. At the same time the punching ball returns into the protective cage 7 so that it is prevented from being further used. To restore the ratchet wheel 34 and with it the pointer 36 into the initial position the end 44b of the pawl lever 44, which extends out of the casing 1, is depressed, so that the other end 44a of this lever raises the lever 41 carrying the pawl 41'. The pawl 41' thereby liberates the ratchet wheel 34 which returns into the zero position in response to the action of the weight 37.

The transmission of the oscillations of the ball or the like to the additive indicating device need not necessarily be effected in the manner shown in Figs. 1, 2, and 4, but may also be carried out with the aid of transmission means of a different nature, the necessary movement being in every case derived from the holding or suspending means for the punching ball or the like at a point where tensioning of a spring member pertaining to this holding or suspending device is brought about by the oscillation of the punching ball or the like. Some examples of such forms of construction of the holding or suspending means will now be described with reference to Figs. 5 and 6 of the drawings.

Figures 5, 6:
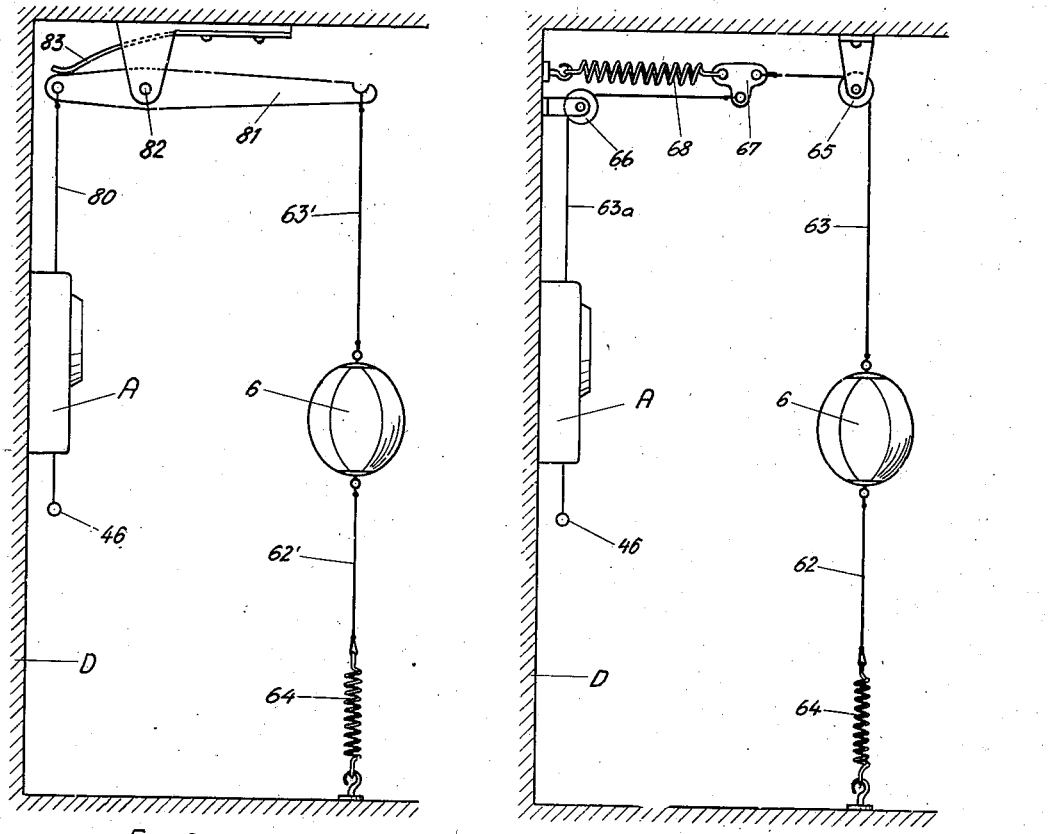
Figs. 5 and 6 show each in side elevation a modified form of construction of the device according to the invention, the additive indicating device being merely marked in and not shown in detail.

Referring to Fig. 5, the ball 6 is interposed between two cords 62, 63 of which the one (62) is initially tensioned by means of a spring 64, while the other is taken over a roller 65 to an intermediate piece 67 from which a further cord 63a leads to the additive indicating device shown diagrammatically at A. This additive indicating device may for example be so constructed as has already been described with reference to Figs. 1 and 2, but it is also possible to modify this device, as will be described in due course with reference to Figs. 7 and 8. To the intermediate piece 67 there is attached a spring 68 the other end of which is attached at 69. When punched, the ball 6 oscillates to and fro and the spring 68 is alternately tensioned and relieved of tension, while at the same time, through the intermediary of the cords 63 and 63a corresponding oscillatory movements are transmitted to the advancing or feed member 41 pertaining to the indicating device A. The entire apparatus may be fastened for example to a door-frame D.

In the form of construction shown in Fig. 6 the ball is again held between two cords 62', 63', the lower cord (62') being again initially tensioned by means of a spring 64, while the upper (63') is attached to the one end of a two-armed lever 81 which is pivoted at 82 and stressed by a leaf spring 83. From the other end of the lever 81 a further cord 80 leads to the indicating device A and transmits to its feed member the oscillations carried out by the spring-stressed lever 81.

Figs. 5 and 6 are merely arbitrarily picked examples of the many possible forms of mounting the blow-receiving member (e. g. punching ball) and of transmitting the oscillations of this member to the indicating device, within the framework of the present invention.

It is possible in many cases to replace by springs the weights used in the constructional examples shown in the drawings for the purpose of initially tensioning certain elements of the apparatus, and vice-versa.

In Figs. 7 and 8 of the drawings there is shown a modified form of construction of the additive indicating device. There is again provided the ratchet wheel 34 which is restored by the weight 37 into the zero position as soon as the pawl lever 44 is brought out of engagement with the ratchet wheel in the manner described with reference to Figs. 1 and 4. The feeding forward of the ratchet wheel 34 is interrupted in this case by a rod 47 encountering the lever 41 carrying the pawl 41', with the result that the pawl 41' is lifted out of engagement with the ratchet wheel. The rod 47 forms the piston rod of a pump 45 and is furnished with a handle 46 extending out of the casing 51. To put the apparatus in readiness for operation the piston rod 47 is pressed down with the aid of the handle 46, a spring 48 wrapped around this piston rod being thereby compressed. The re-expanding of the spring 48 is opposed by the resistance fo the pump 45, so that the piston rod 47 can only ascend slowly. The time required by the piston rod to carry out its stroke to the point of encountering the lever 41 is preferably made adjustable. To the piston rod 47 there is secured a pin 92 extending through a slot 91 in the front wall of the casing 51, which pin is fitted with a pointer 93 adapted to play over a scale 94 provided on the casing, so that the passage of a set training period can be watched. The transmission of the oscillations of the blow-receiving ball or the like to the lever 38 may be effected in any of the ways shown in Figs. 1 to 6, for which reason in Fig. 7 there is only indicated diagrammatically a transmitting member 95 which may stand for the link 39 in Figs. 1 and 4, or for the cord 63a in Fig. 5 or the cord 80 in Fig. 6. To the shaft 35 there is again fitted a pointer 36 which indicates on a scale 95 the total performance achieved during a certain period of training work.

The pointer 36 which indicates the total performance achieved in the course of a set period of training may also carry out a plurality of revolutions, in which case the number of completed revolutions is suitably recorded by means of feed mechanism driven, through the intermediary of appropriate gearing, from the shaft 35 of the pointer 36, and not shown in the drawings.

I claim:

1. In a physical training appliance having a punching ball or the like held at two opposite points by a cord for free oscillation in various planes in response to blows, a ball cage for normally retaining the ball in inoperative position, coin controlled means operatively connected to said cord for releasing said ball, whereby the latter may be brought into operative position, a device for continuously registering the sum total of the effects of repeated blows struck to said ball, actuating means for said registering device operatively connected to said cord, for imparting to said registering device, a movement commensurate with the force of each blow delivered, irrespective of the directions the several blows are delivered, resilient means in operative relation with said ball and with said actuating means, whereby said resilient means is alternatively tensioned and relieved of tension upon the oscillations of said ball, and means for returning said ball to inoperative position in said ball cage.

2. In a physical training appliance having a punching ball or the like held at two opposite points by a cord for free oscillation in various planes in response to blows, and normally held in inoperative position; means operatively connected to said cord for releasing said ball, comprising a sprocket wheel, a sprocket chain carried by said cord and cooperating with said wheel, an abutment on said wheel, a pivoted lever normally in engagement with said abutment for preventing rotation of said wheel in one direction, a second pivoted lever normally engaging said abutment for preventing rotation in the opposite direction, means for releasing said second named lever for permitting rotation of said wheel in one direction to bring said ball in operative position, latch means on said first named lever engageable by said abutment after a predetermined rotation of said wheel for locking the latter in place, and means for releasing said latch means to permit the return of said ratchet wheel and ball to normal inoperative position.

3. Mechanism as claimed in claim 2 wherein said last named means comprises a pulley mounted on the shaft of said ratchet wheel, an arm carried by said first named pivoted lever, a pin carried by said pulley, engageable with said arm for rocking the latter, a cord wound on said pulley, and means cooperating with said cord for rotating said pulley at a predetermined speed.

4. In a physical training appliance having a punching ball or the like held at two opposite points by a cord for free oscillation in various planes in response to blows, means for normally retaining the ball in inoperative position, means operatively connected to said cord for releasing the ball, whereby the latter may be brought into operative position, a device for continuously registering the sum total of the effects of repeated blows struck to said ball, actuating means for said registering device operatively connected to said cord, for imparting to said registering device a movement commensurate with the force of each blow delivered, irrespective of the directions the several blows are delivered, resilient means in operative relation with said ball and with said actuating means, whereby said resilient means is alternatively tensioned and relieved of tension upon the oscillations of said ball, and means for returning said ball to inoperative position.

5. In a physical training appliance having a punching ball or the like held at two opposite ends by a cord or the like for free oscillations in various planes in response to blows and normally held in inoperative position, means including a resilient member completing said cord to an endless drive guided over rollers, means operatively connected to said endless drive for releasing said ball, whereby the latter may be brought into operative position, a device for continuously registering the sum total of the effects of repeated blows struck to said ball, actuating means for said registering device operatively connected to said cord, for imparting to said registering device a movement commensurate with the force of each blow delivered, irrespective of the directions the several blows are delivered, and means for returning said ball to inoperative position.

6. In a physical training appliance having a punching ball or the like held at two opposite ends by a cord or the like for free oscillations in various planes in response to blows and normally held in inoperative position, means including a resilient member completing said cord to an endless drive guided over rollers, a wheel in engagement with said endless drive and normally held in inoperative position, means for releasing said wheel for a predetermined rotation only whereby said ball may be brought into operative position by moving said endless drive, a device for continuously registering the sum total of the effects of repeated blows struck to said ball, actuating means for said registering device operatively connected to said cord, and means for returning said wheel and said ball to inoperative position after a predetermined time.

7. In a physical training appliance having a punching ball or the like held at two opposite ends by a cord or the like for free oscillations in various planes in response to blows and normally held in inoperative position, means including a resilient member completing said cord to an endless drive guided over rollers, a sprocket wheel in engagement with a sprocket chain interposed in said endless drive and normally held in inoperative position, means for releasing said sprocket wheel for a predetermined rotation only whereby said ball may be brought into operative position by moving said endless drive, a device for continuously registering the sum total of the effects of repeated blows struck to said ball, actuating means for said registering device operatively connected to said cord, and means for returning said sprocket wheel and said ball to inoperative position after a predetermined time.

IVAN BENKÖ.